United States Patent
Risberg et al.

[15] 3,636,298
[45] Jan. 18, 1972

[54] STATIC SQUARE-WAVE RESISTANCE TUBE WELDING SYSTEM

[72] Inventors: Robert L. Risberg; Blakeslee G. Wheeler, both of Milwaukee, Wis.

[73] Assignee: Cutler-Hammer, Inc., Milwaukee, Wis.

[22] Filed: Oct. 20, 1969

[21] Appl. No.: 867,703

[52] U.S. Cl. ............................... 219/108, 219/59, 219/116
[51] Int. Cl. ........................................................ B23k 11/24
[58] Field of Search ................ 219/108, 110, 113, 114, 81, 219/59, 102, 116; 321/14, 18, 19

[56] References Cited

UNITED STATES PATENTS

| | | | |
|---|---|---|---|
| 2,493,762 | 1/1950 | Klemperer | 219/117 |
| 3,233,116 | 2/1966 | Waltrous | 219/114 X |
| 3,320,512 | 5/1967 | Kruger | 321/19 X |
| 3,480,852 | 11/1969 | Hung | 321/19 X |
| 3,521,025 | 7/1970 | Opal | 219/67 X |

Primary Examiner—J. V. Truhe
Assistant Examiner—J. G. Smith
Attorney—Hugh R. Rather

[57] ABSTRACT

A resistance welder system for welding a continuous seam throughout the length of a tube or pipe having controlled thyristors for generating a square-wave current of a desired amplitude and at constant or variable frequency. The power is generated and transmitted at high voltage low current and transformed at the welder electrodes to low voltage high current. The system includes a controlled DC link for obtaining a desired voltage and current from a constant voltage source, and a static square-wave generator consisting of an inverter with forcing to generate a square-wave AC current from the DC link output. The voltage converter for controlling the DC link is regulated by a voltage regulator to maintain an average value of AC voltage at the electrode transformer, and a fast responding minor loop current regulator to maintain constant current in the presence of transient changes in resistivity or contact resistance.

13 Claims, 4 Drawing Figures

STATIC SQUARE-WAVE RESISTANCE TUBE WELDING SYSTEM

BACKGROUND OF THE INVENTION

Continuous resistance welding as used in tube or pipe manufacture has consisted of supplying direct current or alternating current at 180 or 360 Hz. to the work piece. Direct current provides a superior weld but transmission from the conversion equipment to the work piece is cumbersome and expensive. Currents on the order of 40,000 amperes at a few volts must be considered. If rectifiers are used to create the DC the diode voltage drop is a substantial part of the low voltage.

Alternating current provides a less satisfactory weld because of the sinusoidal variation in current. However, with alternating current the transmission of power to the work piece is more economical. High voltage such as 440 volts at low current is transmitted to a transformer located at the electrodes of the welder. Commonly, the electrodes themselves make up the single turn transformer secondary winding. In some cases, alternating current welding has another advantage in that current loss around the backside of the pipe is somewhat lower because the AC impedance of this path is higher than the DC resistance.

The present invention incorporates the advantages of both methods and eliminates the disadvantages.

SUMMARY OF THE INVENTION

This invention relates to improvements over prior welding systems whereby the best features of both DC and AC welding systems are used to advantage.

An object of the invention is to provide an improved tube welding system.

A more specific object of the invention is to provide an improved welding system affording a uniform quality weld comparable to that produced by a DC welder while incorporating the advantages of AC transmission of the welding electrical power.

Another specific object of the invention is to provide an improved pipe or tube welding system that provides a DC weld but reverses the voltage and current in a step fashion periodically to maintain the advantages of AC transmission.

Another specific object of the invention is to provide an improved tube welding system of the aforementioned type wherein the square-wave reversals of voltage and current are at a preset constant frequency or at a frequency proportional to voltage.

The most desirable weld is created by putting constant power into the seam during the fusion process. This can be done with a constant DC current. This can also be obtained with a square-wave AC current. The square-wave AC current has the additional advantage of economical power transmission.

One of the major problems in accomplishing a square-wave weld is overcoming the electrical inertia of the weld transformer leakage inductance. Heretofore, near square-wave voltages as shown in FIG. 2a have not produced near square-wave currents. This is because leading and trailing edges of the current become rounded exponential curves as shown in FIG. 2b providing no better weld than is obtained with sine wave voltages and currents.

Therefore, an object of this invention is a square-wave generator with sufficient forcing on the leading and trailing edges of the output voltage to create near square-wave currents and consequently constant power to the seam being welded.

As shown in FIG. 2c and 3a, sufficient overshoot voltseconds are provided to cause the current shown in FIG. 2d and 3b to reverse rapidly and have a small overshoot to compensate for lack of weld power during the current reversal. This desired voltage wave shape is obtained by use of the circuit disclosed in R. L. Risberg copending application, Ser. No. 867,740, filed Oct. 20, 1969, for the solid state square-wave generator herein.

Another object of the invention is to provide current reversals at a rate not greater than that required to avoid saturation of the weld transformer. This means that output frequency need have no greater than a one-to-one proportionality percentagewise to output voltage. Once a current reversal has been accomplished, the DC weld is maintained as long as possible and the voltage is only reversed when the transformer approaches saturation.

In some instances, it is desirable to have either a constant frequency or a frequency-voltage relationship wherein frequency rises more rapidly than output voltage. This is because some current is lost around the side of the pipe not being welded and the impedance of that path is a function of frequency and, therefore, to minimize this wasted energy, frequency may be greater than a one-to-one proportionality with voltage.

Therefore, it is another object of the invention to provide a variable frequency having a greater than one-to-one proportionality with voltage.

As shown in FIG. 4, any voltage-frequency relationship within the shaded area can be obtained.

DESCRIPTION OF THE PREFERRED EMBODIMENT

Figure 1:
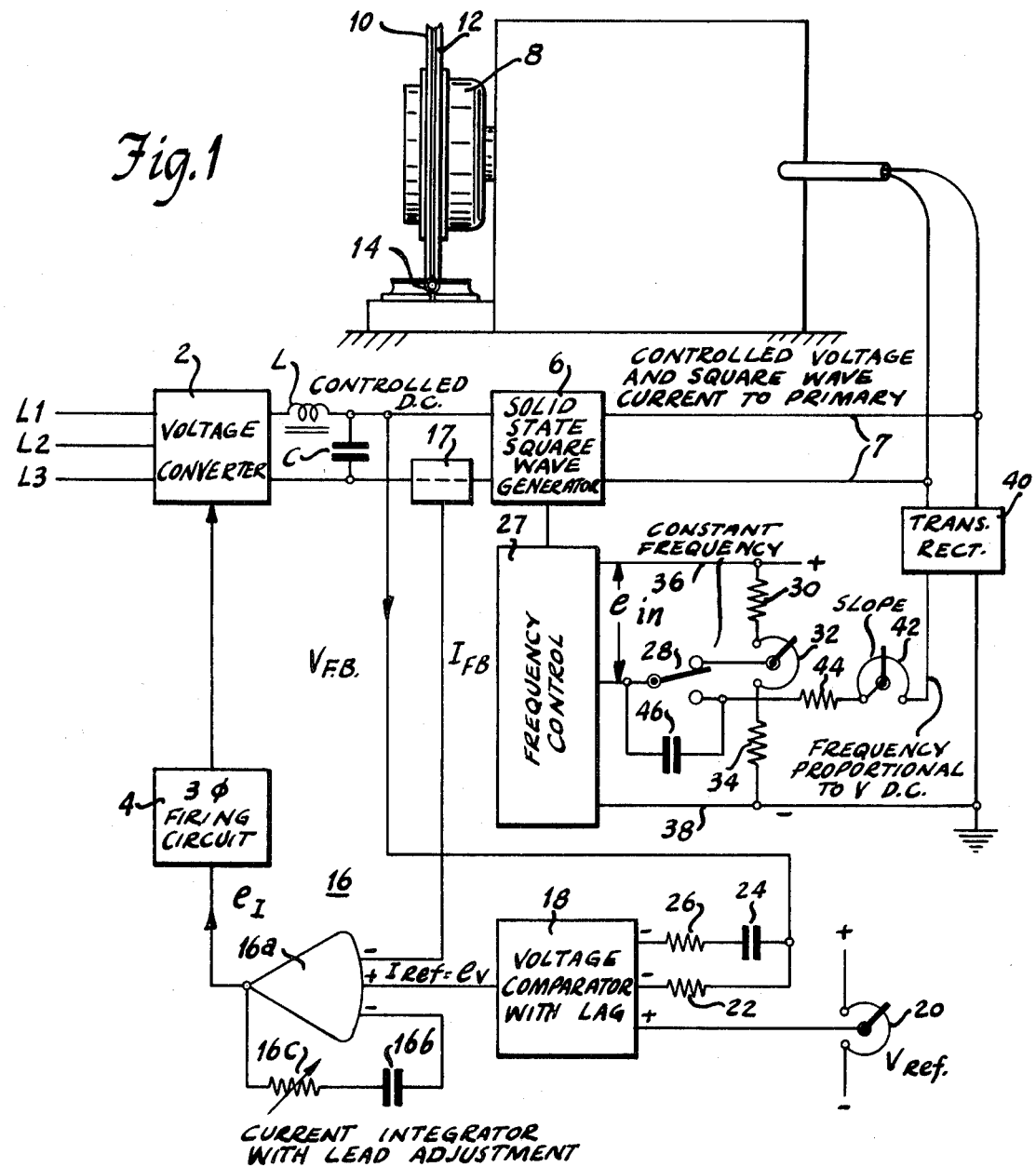
FIG. 1 shows a static square-wave resistance tube welding system constructed in accordance with the invention.
Figure 3:
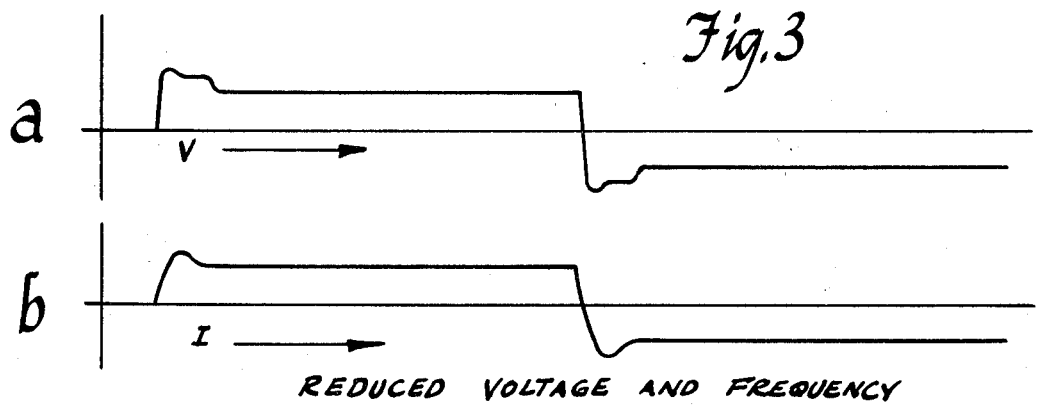
FIG. 3 graphically depicts low output operating characteristics of the invention, curves a and b being similar to curves c and d in FIG. 2 except at low output voltage and current.
Figure 2:
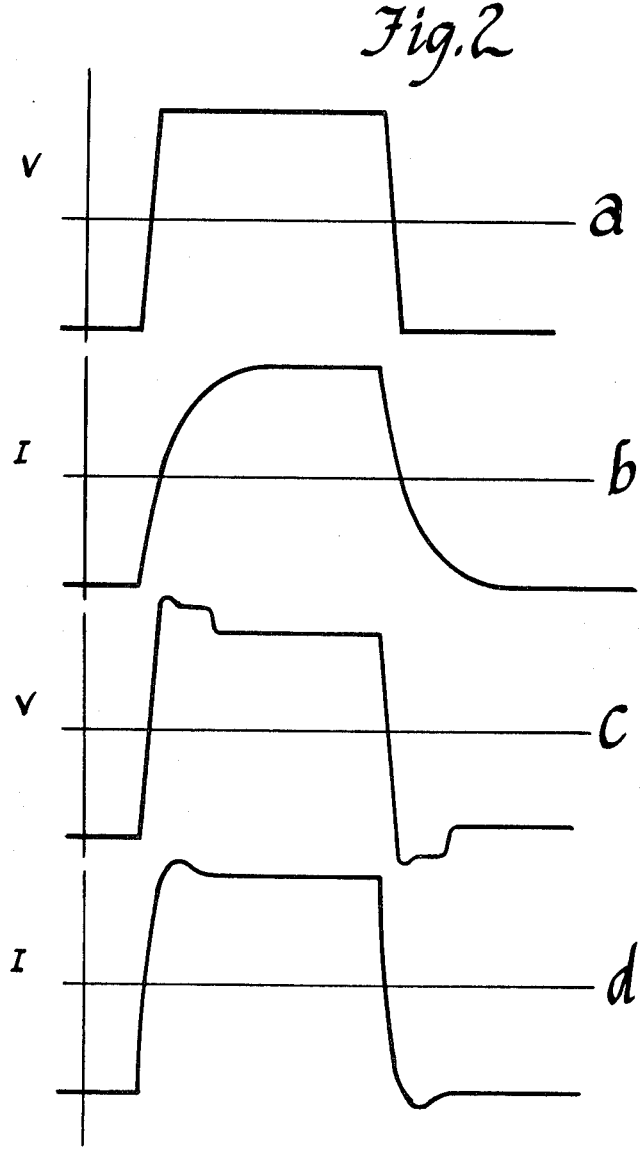
FIG. 2 graphically depicts operating characteristics of the invention as compared to prior art systems, curves c and d showing improved voltage and current characteristics as compared to prior art voltage and current curves a and b, respectively.

As shown in the drawing, a three-phase alternating current source is connected through AC mains or power supply lines L1, L2, and L3 to a voltage converter 2. This voltage converter is a circuit that receives three-phase AC and provides controlled DC at its output, such as a semiconductor controlled rectifier (SCR) bridge or an uncontrolled rectifier bridge followed by a controlled chopper, or the like. For exemplary purposes, it may be assumed that voltage converter 2 is an SCR bridge and that it is controlled by a three-phase firing circuit 4.

The output of voltage converter 2 is applied through an LC filter and a DC bus to a solid state square-wave generator 6. The LC filter comprises an inductance coil L connected at one end to the positive output terminal of the voltage converter and a capacitor C connected from the other end of the inductance coil to the negative output terminal of the voltage converter. The junction of inductor L and capacitor C and the negative output terminal of the voltage converter are connected through the DC bus to the solid state square-wave generator to supply controlled DC thereto.

The output of solid state square-wave generator 6 is connected through conductors 7 to the primary winding of a transformer 8, located directly at the weld electrodes 10 and 12. The electrodes normally are the single turn secondary winding or form a part thereof, this secondary turn being closed through the work piece. These weld electrodes are in the form of shoes or discs or the like that are arranged to slide or roll along the tube 14 as the tube is driven thereunder to maintain continuous contact therewith on opposite sides of the same as it is welded.

Resistance at the seam tends to vary from a minimum, and to vary from this value to higher values when surface and pressure conditions are less than optimum. In order to obtain constant current through the material and hence, constant heat, it is desirable that the voltage rise transiently when increases in resistance are transiently encountered as the pipe moves under the welder. To this end, a system is provided wherein output voltage is compared with a reference voltage and the difference voltage becomes the current reference. This current reference value is then compared with the actual current value in a very fast responding minor loop regulator. The output of this minor loop regulator is the input to the variable voltage actuating means, viz, the controlled bridge rectifier firing circuit.

By providing a slower response in the voltage comparator than in the minor loop regulator, modulations in resistivity tending to cause variations in current will cause output to occur from the minor loop current regulator and thus cause rapid modulation of the output voltage, and consequently, constant heat in the material being welded.

To provide the above-described regulation when welding a wide variety of stock and to maintain stable operation when the discontinuity encountered at the beginning and end of a reel of stock occurs, an RC stabilizing network providing derivative feedback to the voltage comparator is employed, as hereinafter more fully described.

As shown in FIG. 1, the three-phase firing circuit 4 that controls the voltage converter is controlled by the current integrator 16. This current integrator comprises a high gain operational amplifier 16a, an integrating feedback capacitor 16b connected thereto whereby the amplifier output becomes the time integral of the inputs, and an adjustable resistor 16c connected in series with the integrating capacitor for "lead" adjustment.

As shown in FIG. 1 of the drawing, the current integrator receives two inputs, a current reference from a voltage comparator and a current feedback from a current transductor 17 coupled to the negative DC bus. The current reference charges capacitor 16b and the current feedback from the DC bus, being of opposite polarity, discharges capacitor 16b. Putting in an adjustable resistor 16c, that is, an adjustable time constant, in the capacitor feedback circuit around the operational amplifier to subtract from the amplifier feedback is the same thing as adding that much to the input signal. That is, a signal proportional to the rate of change of voltage (derivative feedback) is added to the input signal when variable resistor 16c is increased in value thereby increasing the lead. The lead is decreased by reducing the value of the time constant resistor. This lead is useful in stabilizing the system.

The current reference to the integrator is obtained from a voltage comparator 18 with lag. With lag means that it is a relatively slower responding device such as a magnetic amplifier or the like. The voltage comparator 18 receives a voltage reference signal from a reference potentiometer 20 and a voltage feedback signal via resistor 22, subtracts the latter from the former, and the difference or error voltage becomes the current reference signal. A signal proportional to the rate of change of output voltage is also fed back to the voltage comparator for stabilizing purposes. Capacitor 24 and resistor 26 provide this feedback path.

Solid state square-wave generator 6 is preferably similar to the SCR circuit disclosed in R. L. Risberg copending application Ser. No. 867,740, filed Oct. 20, 1969, as aforesaid, and of single-phase output type. It is controlled by a frequency control circuit 27 that fires the SCR's in the proper order and at the controlled frequency thereby to control the frequency of the output voltage to the welder transformer.

For this purpose, a frequency control circuit 27 is provided with a constant (but adjustable) frequency control and a proportional frequency control, either one of which may be selected for use by setting switch 28 to the proper position.

The constant frequency control means comprises a voltage divider comprising a resistor 30, a potentiometer 32 and a resistor 34 connected in that order from the positive to the negative side of a DC source and the movable tap of the potentiometer being connected to the upper stationary contact of switch 28. The movable contact of this switch is connected to the input terminal of frequency control circuit 27. The positive and negative sides of the DC source are also connected to the frequency control circuit through conductors 36 and 38. With this circuit, a DC voltage is applied to the input terminal of the frequency control circuit to set the frequency of the solid state square-wave generator to a constant value. This constant value of frequency may be adjusted at potentiometer 32 but once the potentiometer is set, the frequency is controlled to a constant steady state value.

The constant frequency control means also comprises means for superimposing on the constant DC voltage at the input terminal a signal proportional to any variation in the output voltage of the solid state square-wave generator. This is done to maintain constant volt-seconds per half-cycle of output voltage as is desired to avoid a DC component in the output voltage which would saturate the transformer. This means comprises an RC coupling from the rectified output of the solid state square-wave generator. For this purpose, the AC output conductors 7 of the solid state square-wave generator are connected to a transformer and rectifier circuit 40 whose output is connected through a slope variable resistor 42, a resistor 44, and a capacitor 46 to the input terminal of the frequency control circuit. The other side of the output of circuit 40 is connected to the negative side of the DC source at conductor 38 that is grounded. In this manner, a signal proportional to any variation in output voltage from the value selected at potentiometer 20 is applied through the RC coupling to modify the frequency accordingly to maintain constant volt-seconds per half-cycle in the output to the welding transformer.

The proportional frequency control means comprises transformer and rectifier circuit 40, slope adjusting resistor 42, constant resistor 44, and switch 28 moved to its lower stationary contact. By proportional frequency control is meant that the frequency varies in proportion to variation in the output voltage. In this position, switch 28 shunts capacitor 46 out of circuit. Therefore, a DC voltage proportional to the output voltage going to the welding transformer is applied from transformer and rectifier circuit 40 through resistors 42 and 44 and switch 28 to the input terminal of the frequency control circuit. This causes the frequency to vary in direct proportion to any increase or decrease adjustment of the output voltage.

Figure 4:
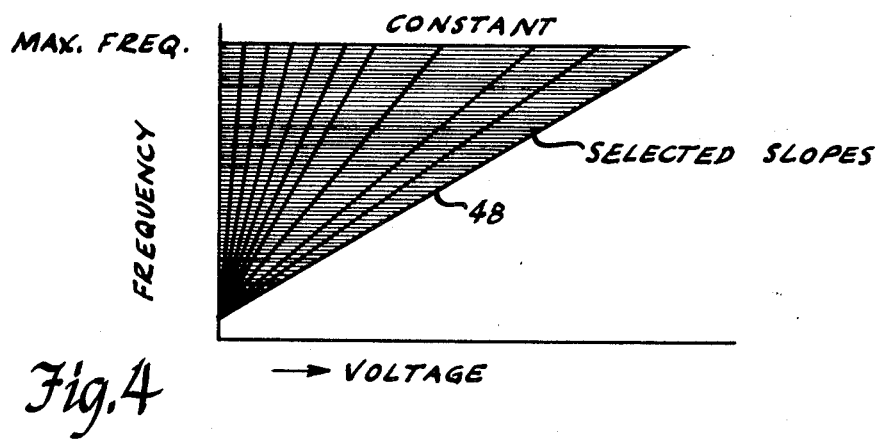
FIG. 4 graphically shows the frequency-voltage characteristics adjustment provided by the invention.

Variable resistor 42 is used to adjust the slope of the frequency-to-voltage relationship as shown in FIG. 4. With resistor 42 completely in circuit, a minimum slope as shown by curve 48 is obtained. By reducing resistance 42, any frequency to voltage relationship as shown by the curves within the shaded area can be obtained, up to a constant maximum frequency indicated by the horizontal top line.

To operate the system, power is applied and the output voltage is set at potentiometer 20. For constant frequency control, switch 28 is left in its upper position as shown and the value of the output frequency is selected at potentiometer 32. The tube is then run under the welder electrodes to weld the seam. For proportional frequency control, switch 28 is moved to its lower position and the output voltage is set at potentiometer 20. A signal proportional to output voltage is then applied through circuit 40, resistors 42 and 44 and switch 28 to the frequency control circuit to cause the frequency to be controlled proportional to the output voltage.

While the system hereinbefore described includes a minor loop current regulator 16, it will be apparent that the output of the voltage comparator 18 could in some applications be used directly to control the three-phase firing circuit.

We claim:

1. In a resistance welding system for producing a uniform continuous weld, the combination comprising:
   power supply lines adapted to be connected to an electrical supply source;
   voltage converter means connected to said lines and supplied with power therefrom and being operable to provide a controlled DC voltage;
   a DC bus connected to said voltage converter means for receiving said controlled DC voltage;

a welder comprising a transformer and electrodes constructed to roll or slide along the work on opposite sides of the joint to apply a welding current across the joint during relative movement between the work and electrodes for continuous seam welding purposes;

a solid state square-wave generator supplied from said DC bus and comprising means operable to provide a square-wave voltage having its leading edge shaped to provide a near square-wave current to the workpiece of controllable amplitude and frequency;

means connecting the output voltage and near square-wave current of said square-wave generator to said welder transformer to produce a uniform seam weld comparable to a DC weld;

means for controlling said voltage converter means to control the DC bus voltage thereby to control the value of the square-wave voltage applied to the welder; and means for controlling said solid state square-wave generator thereby to control the frequency of the square-wave voltage applied to the welder.

2. The invention defined in claim 1, wherein said means for controlling said voltage converter means comprises:
a voltage comparator circuit;
means for applying a voltage reference signal to said comparator circuit;
means for applying a voltage feedback signal to said comparator circuit; and
said comparator circuit comprising means for comparing said voltage reference and said voltage feedback signals and for providing an output signal for control of said voltage converter.

3. The invention defined in claim 1, wherein said means for controlling said voltage converter means comprises:
a fast responding current regulator circuit;
means for applying a current reference signal to said current regulator circuit;
means for applying a current feedback signal to said current regulator circuit;
said current regulator circuit comprising means for comparing said current reference and current feedback signals and for providing a control voltage as a function thereof; and
means responsive to said control voltage for controlling said voltage converter means.

4. The invention defined in claim 3, wherein said means for applying a current reference signal to said current regulator circuit comprises:
a voltage comparator circuit;
means for applying a voltage reference signal to said comparator circuit;
means for applying a voltage feedback signal to said comparator circuit; and
said comparator circuit comprising means for comparing said voltage reference and said voltage feedback signals and for providing an output signal which is the current reference for said current regulator circuit.

5. The invention defined in claim 4, wherein:
said voltage comparator circuit is relatively slow as compared to said current regulator circuit whereby the output of the converter is caused to respond rapidly to transient changes in resistance to maintain substantially constant power to the weld.

6. In a resistance welding system, the combination comprising:
power supply lines adapted to be connected to an electrical supply source;
voltage converter means connected to said lines and supplied with power therefrom and being operable to provide a controlled DC voltage;
a DC bus connected to said voltage converter means for receiving said controlled DC voltage;
a solid state square-wave generator supplied from said DC bus and being operable to provide a square-wave voltage and current of controllable amplitude and frequency;
a welder comprising a transformer and electrodes constructed to roll or slide along the work on opposite sides of the joint to apply a welding current across the joint for welding purposes;
means connecting the output voltage of said square-wave generator to said welder transformer;
means for controlling said voltage converter means to control the DC bus voltage thereby to control the value of the square-wave voltage applied to the welder; and
means for controlling said solid state square-wave generator thereby to control the frequency of the square-wave voltage applied to the welder comprising:
a frequency control circuit operable to control the frequency of the output voltage and current applied to the welder;
means for controlling the frequency control circuit to set said output frequency at a selected value; and
means responsive to variation in the amplitude of said output voltage for controlling said frequency control circuit to vary the frequency to maintain constant volt-seconds per half-cycle in said output voltage.

7. In a resistance welding system, the combination comprising:
power supply lines adapted to be connected to an electrical supply source;
voltage converter means connected to said lines and supplied with power therefrom and being operable to provide a controlled DC voltage;
a DC bus connected to said voltage converter means for receiving said controlled DC voltage;
a solid state square-wave generator supplied from said DC bus and being operable to provide a square-wave voltage and current of controllable amplitude and frequency;
a welder comprising a transformer and electrodes constructed to roll or slide along the work on opposite sides of the joint to apply a welding current across the joint for welding purposes;
means connecting the output voltage of said square-wave generator to said welder transformer;
means for controlling said voltage converter means to control the DC bus voltage thereto to control the value of the square-wave voltage applied to the welder; and
means for controlling said solid state square-wave generator thereby to control the frequency of the square wave voltage applied to the welder comprising:
a frequency control circuit operable to control the frequency of the output voltage applied to the welder;
means responsive to said output voltage and current for providing a control voltage proportional thereto; and
means for applying said control voltage to control said frequency control circuit to maintain the frequency proportional to the value of said output voltage above a minimum bias frequency.

8. The invention defined in claim 7, wherein said means for applying said control voltage comprises:
means for adjusting the ratio of output frequency to output voltage above a minimum bias frequency.

9. In an electronic resistance type tube welding system for producing a uniform continuous weld, the combination comprising:
voltage converter means adapted to be connected to and supplied from an AC source and being operable to provide a controlled DC voltage;
a DC bus connected to said voltage converter means for receiving said controlled DC voltage;
a seam welder comprising a transformer having a primary and secondary, and electrodes connected to the secondary and constructed to engage opposite sides of the seam and to move relative thereto to apply welding current across the seam for welding purposes;
a solid state square-wave generator supplied from said DC bus and comprising means operable to provide a square-wave output voltage and a square-wave current at the workpiece having its leading and trailing edges shaped to compensate for lack of weld power during the current reversal;

means connecting the output of said square-wave generator to the primary of said transformer to produce a uniform seam weld equivalent to a DC weld;

voltage control means for controlling said voltage converter means to control the DC bus voltage thereby to control the value of said square-wave output voltage and current; and frequency control means for controlling said square-wave generator thereby to control the frequency of the square-wave output voltage applied to the primary of said transformer to provide a square-wave current for welding purposes.

10. The invention defined in claim 9, wherein:

said voltage converter means comprises an SCR bridge; and said voltage control means comprises a firing circuit for controlling the firing angle of the SCR's in said bridge.

11. The invention defined in claim 10, wherein said voltage control means also comprises:

a current integrator circuit;

means for deriving a current reference signal and for applying it to said current integrator circuit;

means for deriving a current feedback signal proportional to the output current and for applying it to said current integrator circuit; and said current integrator circuit comprises means for integrating the difference between said current reference and current feedback signals and for providing a control voltage as a function thereof for controlling said firing circuit.

12. The invention defined in claim 11, wherein said means for deriving a current reference signal comprises:

a voltage comparator circuit;

means for applying an adjustable voltage reference to said comparator circuit indicative of the selected value of output voltage;

means for deriving a voltage feedback signal proportional to the DC bus voltage and for applying it to said comparator circuit; and said comparator circuit comprises means for providing an output signal proportional to the difference between said voltage reference and voltage feedback signals which becomes the current reference for said integrator circuit.

13. The invention defined in claim 12, wherein said means for deriving said voltage feedback signal and for applying it to said comparator circuit comprises:

first coupling means for applying a normal voltage feedback signal to said comparator circuit; and second coupling means for applying a derivative feedback signal to said comparator circuit.

* * * * *